United States Patent Office 3,092,965
Patented June 11, 1963

1

3,092,965
AUTOMATIC PRESSURE CONTROL FOR A GAS GENERATING CHAMBER
Bernard Pearlman, Morristown, and Alexander H. Bohr, Sparta, N.J., and Thomas W. Thompson, Nashua, N.H., assignors to Thiokol Chemical Corporation, Trenton, N.J., a corporation of Delaware
Filed May 11, 1959, Ser. No. 812,483
3 Claims. (Cl. 60—39.26)

This invention relates generally to powerplants and more particularly to a system and apparatus for the high speed generation of high temperature and pressure gases for supplying power in the form of potential or kinetic energy.

There are various applications for such powerplants or systems and among these are various kinds of catapults for aircraft or missiles, liquid propellant guns, gas or steam turbines, and any apparatus which requires high power for short durations.

Accordingly, the principal object of the present invention is to provide an improved powerplant comprising a system and apparatus for generating high pressure and temperature gases for short durations by the combustion of an oxidizer and fuel or compressed air and hydrocarbon fuel.

An important object of the present invention is to provide an improved powerplant capable of generating constant pressure and temperature gases in the face of varying gas flow demands, and a wide range of pressure and temperature of the gases as desired.

Another important object of the present invention is to provide an improved powerplant which can be automatically recharged, is provided with automatic combustion controls, and can be shut down automatically at a desired time or after some particular operating event occurs.

A further important object of the present invention is to provide an improved powerplant for the generation of high and constant pressure and temperature gases for short durations by the combustion of compressed air and hydro-carbon fuel and cooling with water wherein the compressed air is used for pumping the fuel and water into the combustion chamber as well as for combustion.

A still further important object of the present invention is to provide an improved powerplant for the generation of high pressure and temperature gases which includes propellant control valves for metering and proportioning the amount of propellants needed to maintain the proper pressure and temperature, and a combustion control system for operating the control valves by either a servo mechanism which senses and maintains combustion pressure and temperature, or a program control which positions the control valves according to a predetermined schedule; or a combination of program and servo control system to respectively position the control valves according to a predetermined schedule and correct for disturbances in combustion pressure.

Another important object of the invention is to provide an improved powerplant of the type described which includes a propellant supply system, a control system, a hydaulic system for powering the control system, and a set of interlocks and automatic controls for the supply and control systems to insure a proper and safe operating sequence of the apparatus.

2

Another object of the present invention is to provide an improved power plant of the type described wherein the elements of the system are assembled into three cooperating major packages or units.

Other objects and advantages of the invention will become apparent during the course of the following description.

In the drawings we have shown one embodiment of the invention as connected for use as a catapult power-plant. In this showing.

In its broadest aspects, the system and apparatus comprising the present invention, provide improved means for the generation of high pressure and temperature gases for short durations by the combustion of compressed air and hydro-carbon fuel and cooling with water (hereinafter referred to as propellants) and may operate entirely automatically.

The system apparatus is assembled into three main cooperating groups of elements as shown in FIGURES 1–4 inclusive, formed by a number of major elements which include a combustion chamber, an ignitor or series of igniters, a set of propellant control valves, a combustion control system, a hydraulic system for powering the control system, a combustion chamber drain valve, propellant storage accumulators, a propellant supply system, a set of pressure range selector valves, a set of interlocks and automatic controls used in combination with the automatic charging or propellant supply system to ensure a proper charging sequence and that combustion cannot be initiated until the equipment is properly charged and safe for use, and a system for signalling the combustion control system to shut down the powerplant and to start the recharging of the unit automatically.

For illustrative purposes, the system and apparatus will be described in its operation with catapults and it is designed to launch heavier and faster types of carrier-based aircraft in rapid succession, in addition to all types currently in operational use. The powerplant will be used in conjunction with catapult launching tube systems of the type currently installed on aircraft carriers. The compressed air and jet fuel (JP–5) are burned to generate gases which push pistons down the catapult tubes as will be described. An aircraft attached to the pistons is launched smoothly at essentially constant acceleration by the use of an electro-hydraulic servo control system which maintains constant combustion pressure. The injection of water into the combustion gases lowers their temperature and prevents overheating of the catapult tubes.

Figure 1:
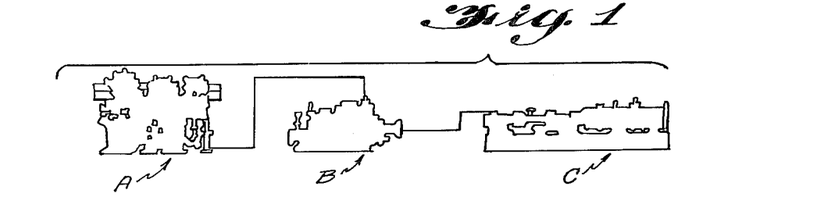
FIGURE 1 is a schematic grouping in outline form of the three major units which cooperate to form the power-plant comprising the present invention.
Figure 2:
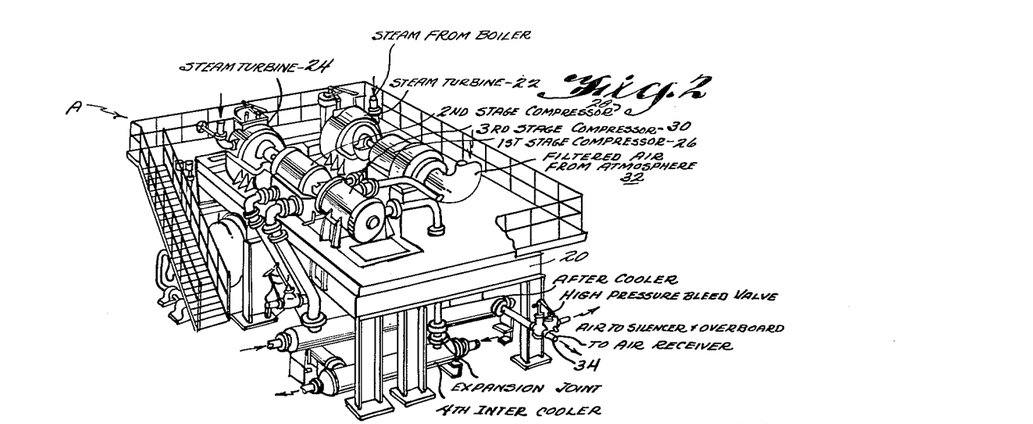
FIGURE 2 is an enlarged perspective view of the air compression unit shown to the left in FIGURE 1.
Figure 3:
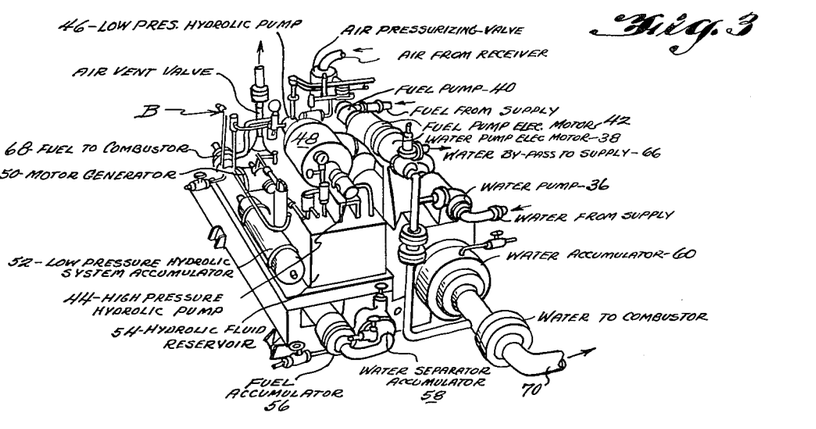
FIGURE 3 is a similar view of the main pumping assembly unit shown in the middle of FIGURE 1.

Referring to FIGURE 1 of the drawings, A designates the air compressor plant, B the main pumping assembly unit, and C the combustor assembly, the three units or packages including among them the major elements hereinbefore set forth. The term package is used to denote a large integrated assembly which can be handled and installed as one complete unit.

AIR COMPRESSOR PACKAGE

The air compressor plant A (FIGURES 2 and 7B) includes a two-deck supporting frame 20 on which the various elements are mounted. A pair of steam driven turbines 22 and 24 respectively drive a first stage, and second and third stage air compressors 26 and 28 and 30, filtered atmospheric air to be compressed entering the plant at 32 and the compressed air being delivered from the plant to an air receiver 33 by way of conduit 34. The air compressor plant also includes coolers, oil systems, controls, piping, etc., as a complete system between inlet and discharge flanges or connections for steam, air and electricity, and a condenser, air ejector, condensate pump and suction air filter.

MAIN PUMPING PACKAGE

Figure 7A:
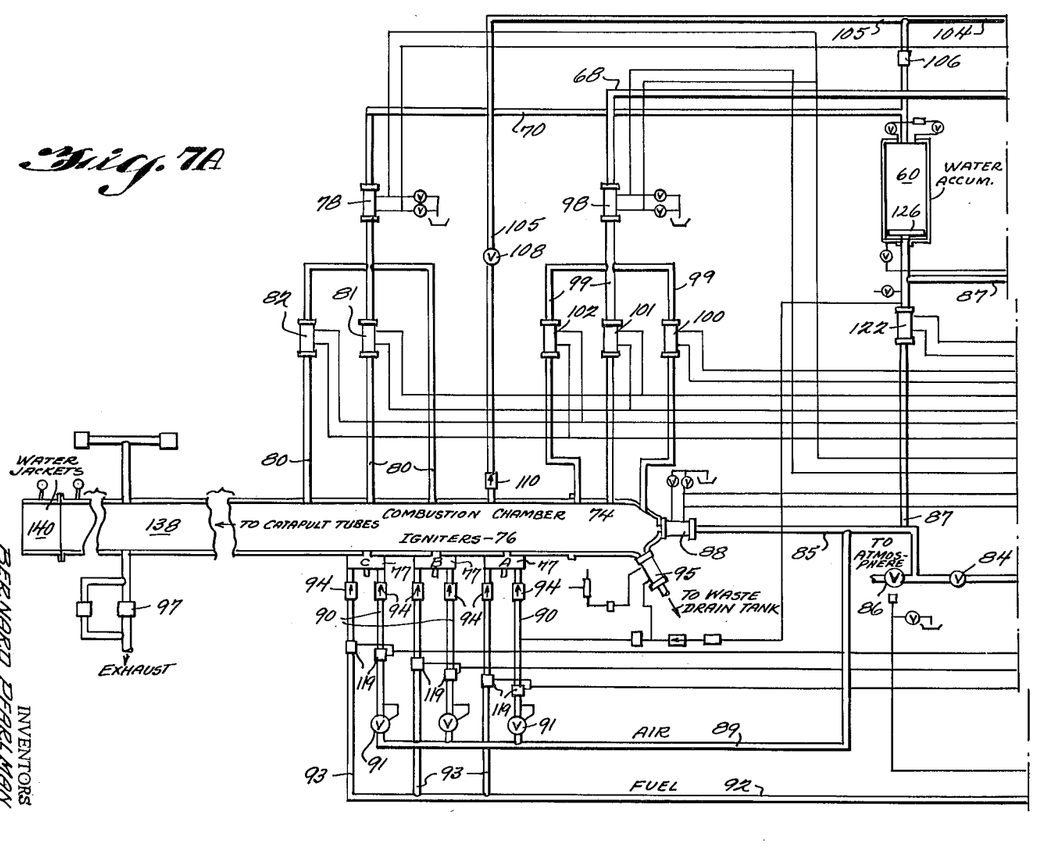
FIGURES 7A and 7B are a schematic view minus the electrical controls of the major elements of the system comprising the present invention.
Figure 7B:
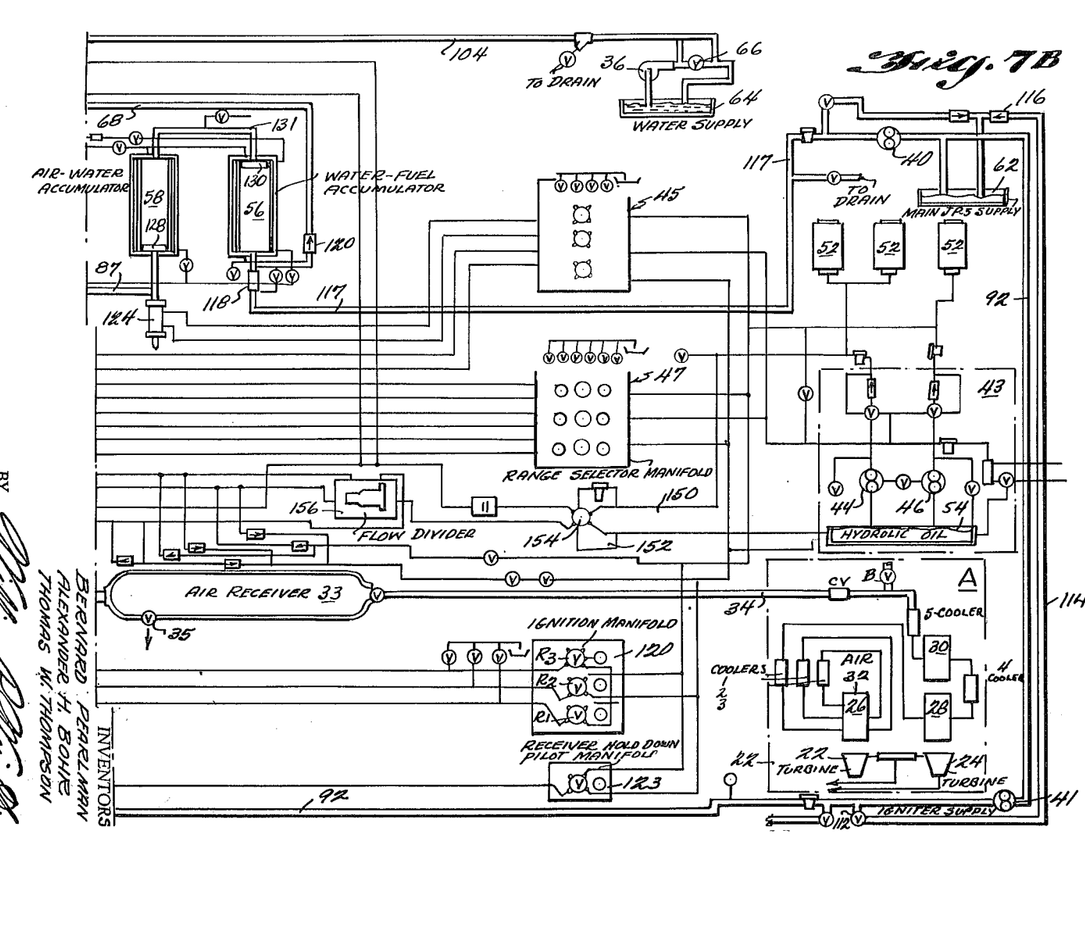

The main pumping assembly or package B (FIGURES 3 and 7A and B) includes a water pump 36 and its driving motor 38, a fuel pump 40 and its driving motor 42, high and low pressure hydraulic pumps 44 and 46, an electric driving motor 48 therefor, a motor generator set 50, a low pressure (500 p.s.i.) hydraulic system accumulators 52, a hydraulic fluid reservoir 54, a fuel accumulator 56, a water separator accumulator 58, and a water accumulator 60. The pumping assembly B includes other conventional units such as an air pressurizing valve, a vent valve, a hydraulic fluid filter and cooler, check valves, conduits for receiving air from the receiver and fuel and water respectively from supply sources 62 and 64, a water by-pass connection and valve 66 to supply, conduits 68 and 70 for respectively carrying fuel and water from their respective accumulators to the combustor assembly C, and essential other elements of hydraulic and electrical power supply systems.

THE COMBUSTOR PACKAGE

The combustor assembly or package C (FIGURES 4 and 7A, B) includes a supporting base 72 and mounted thereon a combustion chamber 74; a group 76 (FIGURE 4) or a longitudinally spaced series of groups 76A, 76B, 76C (FIGURES 7A and 8–11) of igniters adapted to be fired by spark plugs 77 and being mounted peripherally about and communicating with the combustion chamber 74; a servo operated water control valve assembly 78 in the conduit 70 from the water accumulator 60, the conduit terminating in three conduits 80 having communication with the interior of the combustion chamber 74 at axially spaced points, the downstream two of which conduits include water range-selector shutoff valves 81, 82 (FIGURES 7A, 7B and 8–11); an air shut-off valve 84 controlling air flow from the receiver 33 by the conduit 85 which includes a relief to atmosphere valve 86; a conduit 87 connecting the conduit 85 with the fuel and water accumulators 58, 60; and a servo operated air control valve assembly 88.

Figure 4:
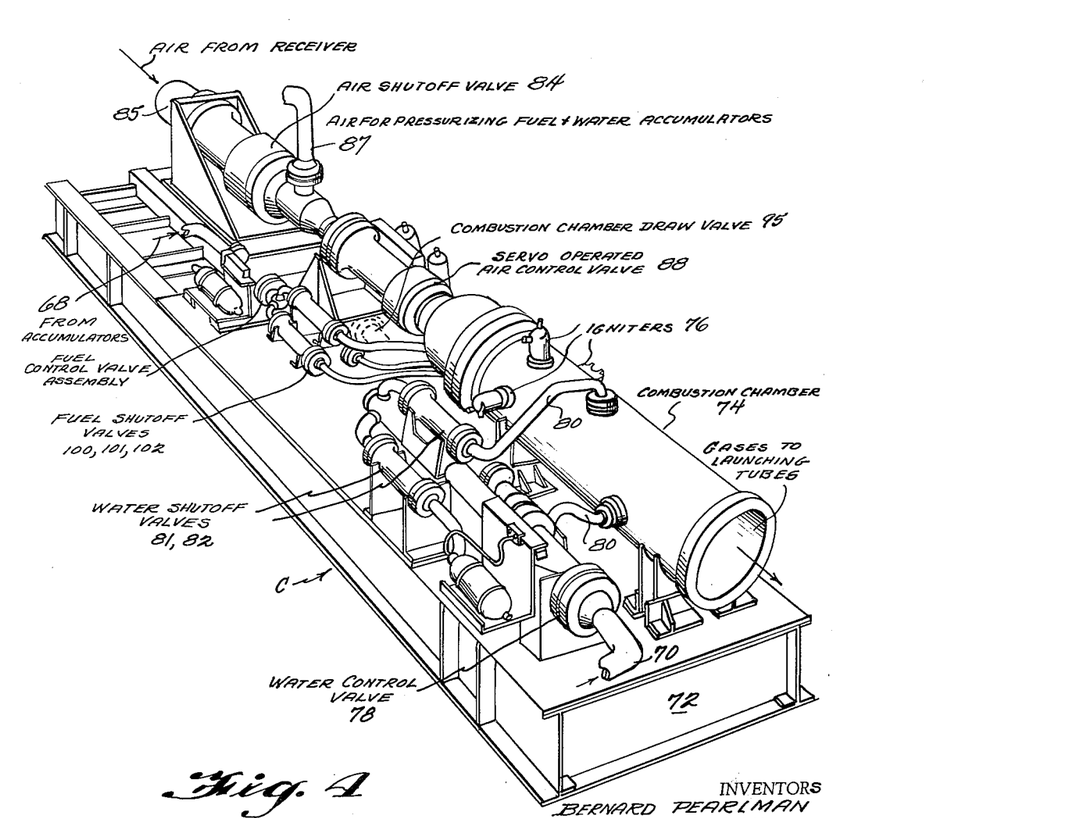
FIGURE 4 is a similar view of the combustor assembly unit shown to the right in FIGURE 1.

Other elements of the combustor assembly C are an air conduit 89 leading from the conduit 85 and terminating in three branch conduits 90 controlled by pressure regulating valves 91 and furnishing air to the igniters 76A, B and C; an igniter fuel conduit 92 extending from an igniter fuel pump 41 and also terminating in three branch conduits 93 communicating with the igniters; check valves 94 in each of the lines 90, 93 adjacent the igniters; a combustion chamber drain valve 95; a pressure breaking valve 97; and a servo operated fuel control valve assembly 98 controlling the flow of fuel through the conduit 68 to the three conduits 99 which communicate at axially spaced points with the interior of the combustion chamber 74, the fuel flow therethrough being controlled by range-selector shut-off valves 100, 101, 102.

It will now be apparent (FIGURES 7A, 7B, 8–11) that water is supplied to the combustion chamber 74 from the reservoir 64 by the pump 36 by way of the water conduit 104, a check valve 106, the water accumulator 60, the conduit 70, the servo operated water control valve 78, and the branch water conduits 80. Optionally, (FIGURES 7A, 7B only), water may also pass from the conduit 104 through an auxiliary conduit 105 to a solenoid operated valve 108 and through a check valve 110 into the combustion chamber.

As stated, fuel is fed by the pump 41 to the igniters 76A, B, C from the fuel reservoir 62 by way of the conduit 92 and the branch conduits 93. The conduit 92 is provided with a pressure relief valve 112 and a bypass conduit 114 for the return of fuel to the reservoir 62 through the check valve 116.

The main fuel supply is drawn from the reservoir by the pump 40 and delivered through a conduit 117 and a check valve 118 to the fuel accumulator 56 from which it passes through a check valve 120 and through the conduit 68 to the servo operated fuel control valve 98, to the range selector valves, 100, 101, 102 and through the branch conduits 99 to the combustion chamber 74. Shut-off valves 119 control the flow of igniter fuel and air in the branch lines 90 and 93.

AIR PRESSURIZING SYSTEM

An important feature of the present invention resides in the use of compressed air for pumping fuel and water into the combustion chamber, as well as for combustion as will now be described.

As seen in FIGURES 7A, 7B and 8–11 inclusive, compressed air from the receiver 33—which has a relief valve 35 set at 1650 p.s.i.g.—passes through the motor operated shut-off valve 84 and by way of conduit 85 to the servo operated air control valve 88 leading to the combustion chamber 74. Compressed air also passes to the igniters 76A, B, and C from the conduit 85 by way of the conduit 89 and to the accumulators 60 and 58 by way of the conduit 87 which includes a pressurizing valve 122 and a vent valve 124.

It is to be noted that the chambers of the accumulators 60, 58 and 56 respectively include a free floating piston or dividers 126, 128 and 130. In the positions shown (FIGURES 7A, 7B), the water accumulator 60 is fully charged with water above the piston 126, water occupies the space above the pistons 128 and 130 respectively in the accumulator 58 and its connecting conduit 131 with the accumulator 56, and fuel occupies the space below the piston 130 in the accumulator 56.

It will be apparent that upon the opening of the valve 122 as will be described, compressed air acts against the bottom of the piston 126 to pressurize the accumulator, and when the control valve 78 is opened, will move the piston upwardly in the water accumulator 60 to eject the water therein into the conduit 70 to the water control valves 78, 81 and 82 (see also FIGURES 8–11 inclusive) and to the combustion chamber 74.

Similarly, the compressed air pressurizes the accumulators 58, 56 and when the control valve 98 is opened, will move the piston 128 upwardly forcing the water thereabove to pass through the conduit 131 and move the piston 130 downwardly to eject the fuel in the accumulator 56 into the fuel line 68 and to the fuel control valves 98, 100, 101, and 102 and to the combustion chamber.

The high pressure and temperature gases generated in the combustion chamber 74 during operation of the system, discharge directly against pistons 136 to which an aircraft to be catapulted is attached, the pistons moving along a pair of parallel catapult tubes 138 and being arrested at their end by water brakes 140.

THE HYDRAULIC SYSTEM

As seen in FIGURES 7A and 7B, the hydraulic pumps 44 and 46 are elements of a hydraulic system 43 for powering the combustion control system which includes a pressurizing and vent manifold 45 including pilot, vent and bleed valves and a range-selector manifold 47 including three range-selector pilot valves $R_1$, $R_2$, and $R_3$. When a minimum propellant flow rate is required, only the selector control valve $R_1$ is opened which permits flow of hydraulic fluid during operation of the system, to the fuel range selector valve 100 only.

An intermediate propellant flow rate requires the opening of range-selector control valve $R_2$, which also permits flow of hydraulic fluid to fuel and water range selector valves 101 and 81, and a maximum propellant flow rate requires the additional opening of the range-selector control valve $R_3$ permitting the added flow of operating hydraulic fluid to the fuel and water range selector valves 102 and 82.

The igniter fuel and air valves 119 are hydraulically operated and controlled by an igniter manifold 120 also including igniter pilot valves $R_1$, $R_2$, $R_3$ controlling single ducts to the valves 119 but no return conduits as the valves 119 are spring-biased closed. A receiver blowdown pilot manifold 123 is connected to the hydraulic system 43 and to the air vent valve 86.

Figure 5:
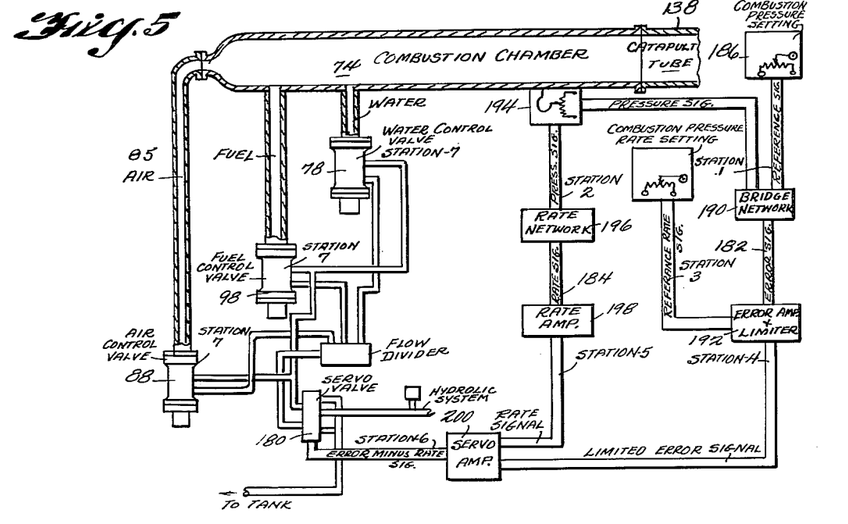
FIGURE 5 is a schematic view showing the servo control system.
Figure 6:
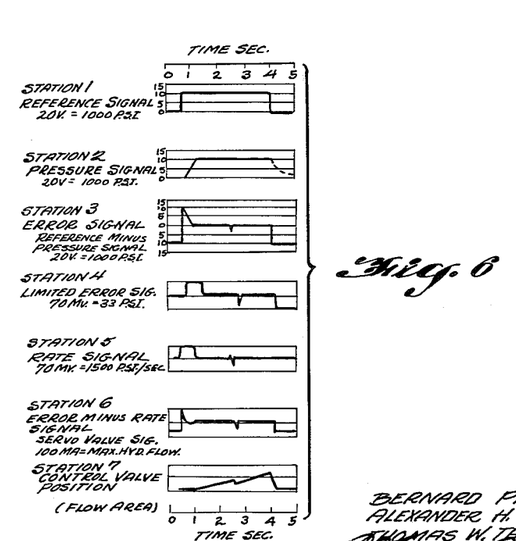
FIGURE 6 is a graphical representation of typical curves showing the servo control system's operating characteristics at the seven phases or stations for a typical launching.

The servo control system is schematically shown in FIGURE 5 and its characteristic operating curves in FIGURE 6, and the hydraulic system therefor in FIGURES 7A and B which is a part of the system 43 just described. A high pressure hydraulic line 150 leads to the combustion control system 152 and its single control valve 154 from whence the flow passes to a flow-divider stepped piston 156 from which hydraulic conduits lead to the three propellant control valves 88, 98 and 78 which are thus, in effect, physically linked so as to be simultaneously operated as will be set forth in phase V of the operation of the system, to be described. The stepped flow divider 156 divides the flow from the valve 154 into three flows at fixed ratios, has only one moving part, and very low inertia. Thus, the sum of the three flows leaving the flow-divider 156 to the propellant control valves equals the entering flow.

THE SERVO CONTROL SYSTEM

The internal combustion catapult powerplant has two control phases: (1) the sequence control phase which prepares the catapult for firing by operating range values, pressurizing the various systems, checking the safeguards, and in general, setting up the components for the firing stage; and (2) the servo control phase which controls the catapult in the firing stage.

The servo control system is the means by which the main propellant flow into the combustion chamber is controlled to maintain the desired combustor pressure. The operation of the servo system is a phase of the sequence control system of the catapult powerplant. Up to the time of actual launching, the servo system is electrically biased, by unbalancing the error bridge circuit, to keep the main control valves closed. Upon receipt of the launching signal, which is automatically given when the proper firing of one of the igniters is sensed, the closing bias on the servo is removed and the control operation begins.

The servo control system is made up of four basic parts: (1) the combustion chamber pressure transducers 188 and 194; (2) the amplifier system; (3) the servo control valves 180, and (4) the flow divider 156 and three main propellant control valves 88, 98 and 78. The above components perform the following tasks in the servo control system:

THE COMBUSTION CHAMBER PRESSURE TRANSDUCERS

The two pressure transducers both translate the pressure in the combustion chamber 74 into an electrical signal. One of these signals is compared to a reference signal in the error bridge circuit and forms the input to the error amplifier. The other pressure transducer electrical output is differentiated by the rate circuit whose output is an electrical signal which is proportional to the rate of change of pressure in the combustion chamber.

The magnetic amplifier system is a two-channel feedback system, one channel 182 amplifying an electrical signal proportional to pressure error and the other channel 184 differentiating and amplifying a signal proportional to pressure back to servo amplifiers. The error signal in channel 182 shows the difference between the actual pressure in the combustor and the pressure for which the combustion system is set. The channel 184 is a rate channel which indicates the rate of pressure change in the combustor and is used to stabilize the control system by anticipating the approach of the combustor pressure to the set point, its signal opposing the limited error signal on start up so as to eliminate system pressure oscillations.

While the foregoing relates to the maintaining of the pressure in the combustor 74 to a certain set point, another mode of control which the servo system can perform is that of maintaining an initial rate of rise pressure accomplished by the use of the error limiter which can be preset to allow only a certain maximum error amplifier output signal. In this way, the rate opening of the propellant valves 88, 98 and 78 is controlled and hence, the desired rate of rise pressure is maintained. The rate signal is therefore also a constant during this initial rise in pressure. Consequently, the position of the servo valve is held at one value, that is, until the pressure in the combustor 74 reaches a value at which the error signal is less than its limited maximum value. From this point on, the limiter does not perform and the run continues in the normal manner as will now be described.

As seen in FIGURE 5, a ten-turn error reference potentiometer 186 is provided as a part of an error bridge circuit as is an error pressure transducer 188 which is a Bourdon tube driven potentiometer with the same resistance as the potentiometer 186, the tube driving the potentiometer slide to give a resistance proportion equal to the tube pressure. The error signal, if any, passes from the bridge circuit 190 formed by the potentiometers 186, 188, is amplified by a magnetic amplifier having a voltage output proportional to the voltage input in the operating range of the amplifier, adjustment of which can change the proportion of output to input on the gain of the amplifier.

An error signal then passes to a limiter 192 which prevents the output of the amplifier from going above an adjustable pre-set value by making use of the forward voltage drop of special rectifiers in the circuit, the drop being comparable to the bias on a diode type rectifier, the rectifiers being connected and paralleled with the output terminals of the amplifier. If the amplifier output voltage does not exceed the magnitude of the forward voltage drop of the limiter rectifier there will be no effect. If, however, the output voltage exceeds the forward drop on the rectifiers, they will then conduct and act as shunt loads across the error amplifier. An adjustable resistor is in series with the error amplifier output and controls the limiting points or the applied voltage through the limiter rectifier.

The channel 184 includes a rate pressure transducer 194 which is similar to the error transducer 188 and a rate circuit or network 196 which differentiates the output of the rate pressure transducer 194 and converts this signal to one which is proportional to the rate of the pressure change in the rate pressure transducer Bourdon tube. The rate circuit 196 consists of a capacitor in series with the output of the pressure transducer 194, which conducts only changes in voltage produced by the change in voltage across the rate pressure transducer potentiometer.

The channel 184 also includes a rate amplifier 198 which is similar to the error amplifier except that it has a much higher gain in that it takes a much smaller signal input than required by the error amplifier to produce the same output voltage, the gain being adjustable, and a servo amplifier 200 which also receives the error channel signal to produce the error minus rate signal to the servo valves 180. The latter are electrically-operated four-way valves, each of which flows hydraulic oil of a quantity and direction proportional to the outlet of the servo amplifier.

SERVO CONTROL SYSTEM OPERATION ERROR SIGNAL

The error reference potentiometer 186 is set on the basis that the full resistance, 2,000 ohms, equals 1,000 p.s.i. in the combustion chamber 74. The error pressure transducer 188 is calibrated to match the error reference potentiometer 186. Therefore, when the latter is set for a particular run, for example 500 p.s.i. or midway on the potentiometer, there will be an error signal voltage proportional to the difference of the slide wire positions on the two sides of the bridge. Hence, when the transducer sees the combustion pressure of 500 p.s.i. which will move its slide wire to the midway point of the potentiometer of the error transducer 188, the bridge will be balanced and the error signal will be zero. Any deviation from this point will unbalance the bridge and consequently establish an error signal of proper size and polarity.

RATE SIGNAL

The rate signal is established through different means. The rate pressure transducer 194, as does the error pressure transducer 188, provides a voltage output proportional to the pressure in the combustor 74. This voltage is applied to the rate circuit which consists of a series capacitor which develops an output voltage proportional to the rate of change of its input voltage.

ERROR MINUS RATE SIGNAL

The error and rate signal voltages are channeled through their respective amplifiers and combined at the input of the servo amplifier 200. Their polarities are so connected that the input to the servo amplifier is equal to the error minus the rate signal. The combined signals are again amplified in the servo amplifier 200 and in turn are applied to the torque motor of the servo valve.

As stated, the servo valve 180 is a four-way valve which will connect high pressure hydraulic oil to the opening or closing ports of the flow divider to in turn operate the main propellant control valves 88, 98 and 78 as dictated by the polarity and aptitude of the differential current the servo amplifiers 200 send through the coils of the servo valve torque motor. The main propellant control valves 88, 98, and 78, hydraulically linked and driven by the flow divider, control the flow of propellants ignited in the combustor 74. This produces a pressure which, in turn, is sensed by the error and rate pressure transducers 186, 188, closing the two channels of the servo loop.

The curves of FIGURE 6 showing the servo system operating characteristics for a typical launching are for seven specific stations as located in FIGURE 5 and disclose the signal voltages as plotted against time in seconds.

CONTROL CONSOLES

As indicated schematically in the drawings, FIGURES 12A, 12B, 12C and 12D, various control panels essential to the operation of the powerplant and the catapult are provided and consist in assemblies of switches, indicators, and lights mounted on suitable panels from which manual control of the powerplant is exercised. The lights on the consoles are of three colors, "green" indicating proper operation or go ahead (motor running lights), "red" indicating stop operation or malfunction (test lights), and "amber" monitoring lights which are observed during the operation.

A main control console arranged for one-man operation of the catapult and powerplant is provided and includes: (1) a start up panel which energizes the catapult control and starts all of the pumps; (2) an operation panel housing the push button, status and monitoring lights (including emergency type) to operate the catapult; (3) a test panel containing the test lights and switches needed for initial and malfunction checkout of the catapult; (4) a transfer switch panel containing the action cut-out and emergency transfer switches; (5) a relay and terminal board which mounts the control sequencing relays and connection blocks; and (6) the servo group which houses the servo relays, amplifiers and circuit wiring.

During regular launching operations, the main control console operator is concerned with the operating panel only. He makes and reads his setting and monitors the status of the catapult machinery with his status lights. The test panels will have all of its lights extinguished by the test lights cut-out switch. The start up panel will only have lights which will be continuously on and will be observed only at the initial energizing of the catapult.

A compressor control console is provided to safely and efficiently operate the entire compressor plant A by enabling the monitoring of all strategic temperatures and pressures throughout the compressor plant, and the making of all operating adjustments relating to the varying compressor output.

The compressor control console includes all controls necessary for operation of the compressor plant as well as manual controls (emergency) for the first and third stage bleed valves. The temperature monitor equipment is employed to monitor the bearing temperatures and discharge air temperatures of the compressor and to sound an alarm along with an alarm light should any of the temperatures exceed a predetermined safe limit or if there should be a failure of cooling water pressure or tube oil pressure, etc.

During normal operation, the operation of the compressor plant A is automatic (after start-up) with the exception of compressor output settings. The main control console operator signals the compressor operator by means of an air order telegraph and if the desired pressure setting is higher than the previous one, the operator simply adjusts a pressure setting knob adjacent the telegraph. If the desired setting is to be lower, the operator again adjusts the knob and then bleeds the air receiver down to the desired pressure by means of an adjacent bleed push button.

The telegraph unit consists of two needles, a red one for desired pressure and a black one for actual pressure. The operator is alerted to a pressure change by a light and an audible alarm and he acknowledges the order by means of a push button.

Other control panels include a deck edge control panel which is the operating station for bridle tensioning, retraction, and the culmination of the catapult operation, the "fire" phase and includes the push button and lights for these operations as well as a "suspend" switch and status lights; a primary fly panel having a "suspend" switch and lights plus two other lights, "final ready" and "catapult energized"; and an auxiliary light panel containing three indicator lights "first ready," "standby," and "final ready."

OPERATIONAL PROCEDURES AND CHECKS

I. Start Up

A. Energize main control console
  (1) "Suspend"
  (2) Throw 120 v., 60 cycle power on
  (3) Start all pumps and open air valve
B. Start up compressor plant
C. Check out catapult
  (1) Visually check components
  (2) Check main control console test panel
  (3) Test igniters
D. Make no load launch

II. Launch Operation

The following is a description of a typical launch, one that is preceded by a launch which required a different setting to obtain the desired aircraft and speed.

The first launch of a run, however, will be similar with the exception of check out procedure and automatic reset will have been previously accomplished.

A. *Completion of previous launch.*—As the pistons 136 in the catapult tubes 138 reach the end of the launching stroke, they uncover the powerplant cut-off and end of run pressure switches to the generated pressurized gases which have driven the pistons down the catapult tubes, thus actuating these pressure switches.

The operation of the powerplant cut-off pressure switches de-energizes the "fire" circuit extinguishing the igniters 76 by closing the igniter propellant valves 119 and cutting off the igniting spark plugs 77. Also, the operating signal to the servo system is removed causing the servo system to close the main propellant valves 88, 98 and 78. At the same time, the powerplant cut-off pressure switch also energizes the accumulator pressurizing and vent pilot solenoid valve which initiates the hydraulic action to close the accumulator pressurizing valve 122 and through further hydraulic sequencing, to open the accumulator vent valve, 124, after the accumulator pressurizing valve 122 is closed.

The operation of the end of run pressure switch opens the catapult exhaust valve 97 by means of a relay and solenoid pilot valve. The launch complete light is also energized at this time signaling all stations of the final operation of the launch.

B. *Automatic reset and recharge.*—As the pressure in the combustion chamber 74 is vented through the catapult exhaust valve 97, the pneumatic pressure which has been keeping the combustion chamber drain valve 95 closed against a spring force, is permitted to escape through igniter 76A so as to allow the combustion chamber drain valve to open when a predetermined pressure is reached in the combustion chamber.

When the combustion chamber drain valve reaches its full open position the drain valve open limit switch is actuated, energizing the post run cooling valve which is then opened to allow a small amount of water to enter the combustion chamber. This water and any water and fuel remaining in the combustion chamber from the previous launching flows through the combustion chamber drain valve to a waste tank.

The combustion chamber drain valve open limit switch also energizes the two servo zeroing solenoid valves which apply hydraulic force to the flow divider 156 which assures its being in the closed position.

Simultaneously with the above operation, the recharging process is taking place. The bleed valve at the discharge of the air compressor closes and the pressure in the air receiver 33 is built up to the setting. The continuously running water pump 36 pressurizes the water side of the floating piston in the water accumulator 60 moving the piston 126 to the fully charged position, the air side being vented. Likewise, the main JP-5 pump 40 fills the JP-5 accumulator 56. The high and low pressure hydraulic pumps recharge their respective systems and accumulators.

The above operations are monitored by the high pressure hydraulic pressure switch, igniter-JP-5 pressure switch, water accumulator limit switch and the JP-5 accumulator limit switch. These switches are connected in a series circuit with the following other electrical switching devices which must all be in the correct position in order to further sequence the launching operation. This circuit is referred to as the "interlock complete" circuit and upon the completion of this circuit, the interlock complete light is energized and the first ready phase of the sequence control system is armed.

The other above electrical switching devices monitor the following operations: Range valve position, runaway shot preventor circuit energized, catapult water brakes full, catapult grab positioned, seal strip tension pressure, condition of deck facilities, position of main propellant valves, servo system energized, and condition of suspend circuit.

C. *Manual settings.*—In compliance with instructions, the main control console operator will set the range, chamber pressure, chamber pressure rate, bridle tensioning pressure regulator and order the air receiver pressure. A change in the type of aircraft to be launched from that just previously launched, will require a revision of these settings.

Retraction of the shuttle is accomplished by the deck edge operator after the launch complete signal has been received.

D. *Interlock complete and first ready.*—The interlock complete light should now come on at all stations showing catapult status signifying the condition of the catapult as follows:
  (1) Flow control valves 88, 98 and 78 closed.
  (2) Servo control system ready.
  (3) Range valves have assumed the position dictated by the range switch 47 setting.
  (4) RSP (runaway shot preventor) system energized.
  (5) Strip tensioning pressure on.
  (6) Flight deck clear and ready.
  (7) Servo system hydraulic pressure on.
  (8) Igniter JP-5 pressure on.
  (9) JP-5 accumulator 56 charged.
  (10) Water accumulator 60 charged.
  (11) Right and left water brakes ready.
  (12) Grab in position.
  (13) Servo valves synchronized.
  (14) Shut-off valve closed.
  (15) Flow divider 156 closed.
  (16) Zeroing valves open.
  (17) Pressure breaking valve open.
  (18) Ignition detector pressure switches reset.
  (19) Post run cooling over and reset.

Upon the completion of all settings and observation of the interlock complete light, the first ready push-button may be depressed to continue the sequence of operation.

The operation of the first ready push-button energizes the accumulator pressurizing and vent pilot solenoid valve which now reverses its powerplant cut-off operation by initiating hydraulic flow to close the accumulator vent valve 124, the hydraulic sequencing valves on the pressurizing and vent manifold 45 at this point do not allow the accumulator pressurizing valve 122 to open until the accumulator vent valve 124 is closed. The flow of high pressure air thru the accumulator pressurizing valve applies pressure to the main water and main JP-5 accumulators 56, 58 and 60 and also operates the combustion chamber drain valve 95 to move it from the open to the closed position. The deactuation of the combustion chamber drain valve open limit switch ends the post run cooling and servo zeroing cycle.

At the same time the catapult exhaust valve close pilot solenoid valve is energized reversing the hydraulic flow to the catapult exhaust valve 97 causing the valve to close.

The proper operation of these valves are monitored by limit switches which are arranged in a series circuit. When all the valves have completed their full stroke the limit switches are actuated completing the circuit which in turn energizes the first ready lights and arms the subsequent sequence phase standby.

E. *Stand-by and final ready.*—The stand-by and final ready phases are for the purpose of readying the catapult and aircraft for the launch and no powerplant operation occurs in these phases but as before, the operation of these phases arm the subsequent phase which is fire and which is signalled by the lighting of the final ready light.

After tensioning the bridle and having received the first ready signal, the deck edge operator may now request standby by pressing the standby button. The stand-by lights should light up. They will not light if, there is more than one catapult operating, if the adjacent catapult has reached the standby phase but has not as yet gone into the fire phase. This will be indicated by light "other catapult in standby." As soon as the adjacent catapult fires, the standby phase may be attained in the normal manner, by pressing the standby button.

Upon receipt of the audible and visual standby signal, the main control console operator will recheck his console settings. After finding all in order, he will press the final ready button which will energize the final ready lights notifying all stations that the catapult is armed to fire.

F. *Fire.*—In response to instructions from the catapult officer, the deck edge operator will press the fire button. This commits the catapult to a launch, it locks out the suspend switch, and fires the three igniters 76A, B and C. The detection of the firing of any igniter by a thermal switch therein signals the servo control system to introduce the main propellants into the combustion chamber 74 and energizes the fire lights.

The combustion of the air and JP-5 is then accomplished with the addition of water to lower the temperature of the combustion products.

The piston and attached aircraft are pushed down the catapult track under combustion pressure which is maintained constant by the servo system's control of the main propellant flow control valves 88, 98 and 78. As the piston travels past the powerplant cut off and end of run switches actuating them with tube pressure, the launch complete phase is again initiated.

III. Secure

A. Shut down catapult
 (1) "Suspend"
 (2) Close air valve and shut down all pumps
 (3) De-energize main control console
B. Shut down compressor plant

CATAPULT POWERPLANT OPERATION

The operation of the high pressure and temperature gas generating system comprising the present invention is described in connection with its use as a powerplant for an aircraft catapult. For ease of understanding, the operating sequence of the catapult powerplant has been divided into seven phases as illustrated specifically and schematically in FIGURES 8–11 inclusive.

Figure 8:
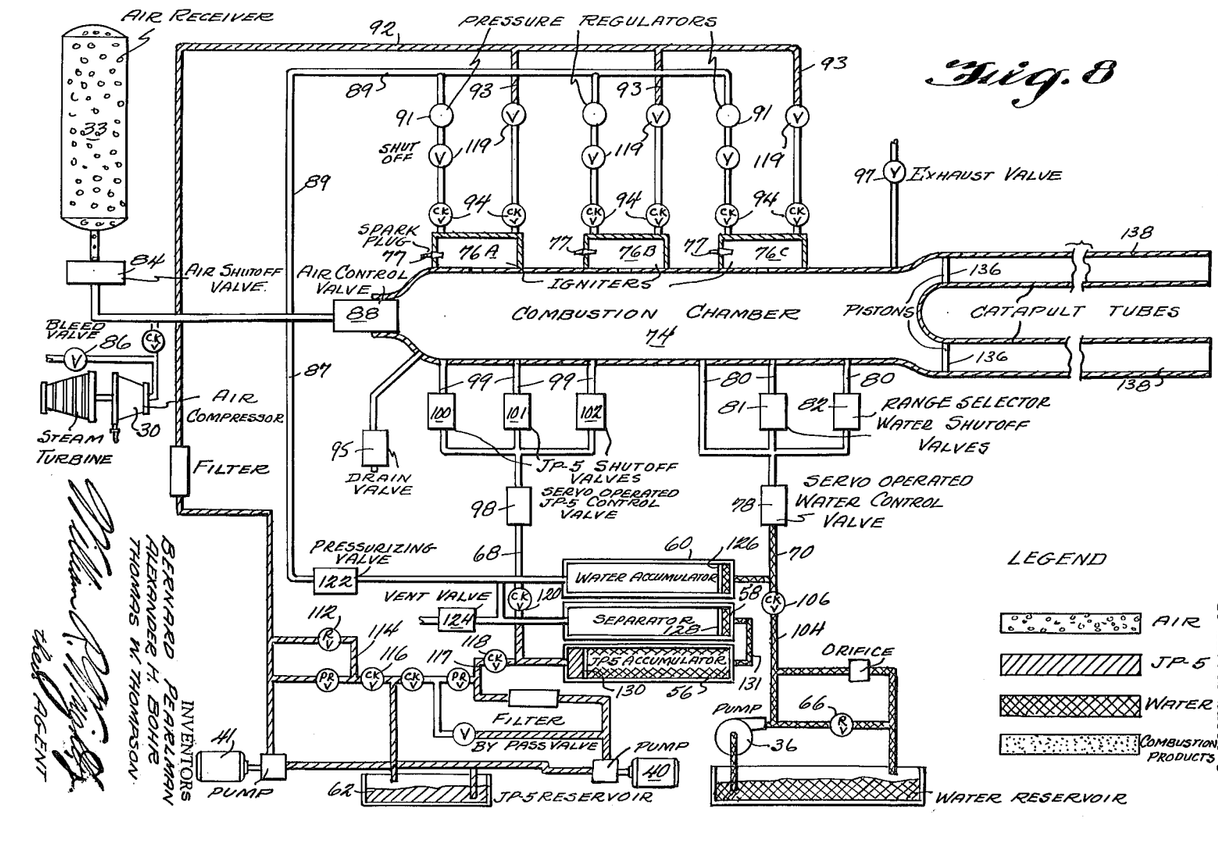
FIGURE 8 is a schematic view of phase 1 of the operation of the internal combustion powerplant as applied to a catapult showing conditions at the beginning of the charge.

Phase I, beginning of charge, FIGURE 8.

The propellant supply system is in operation and the propellants are beginning to flow into their respective accumulators. The air compressor 30 has started to charge the air receiver 33, the fuel supply pump 40 is charging the fuel accumulator 56, and the water supply pump 36 is charging the water accumulator 60. In addition, the igniter fuel pump 41 has started to build up pressure for use with the igniters 76A, B and C.

It will be noted that the three servo operated, main propellant valves, 88, 98 and 78, are closed as are the fuel and water shut-off valves 100, 101, 102 and 81, 82 to the combustion chamber, and 119 to the igniters.

Figure 9:
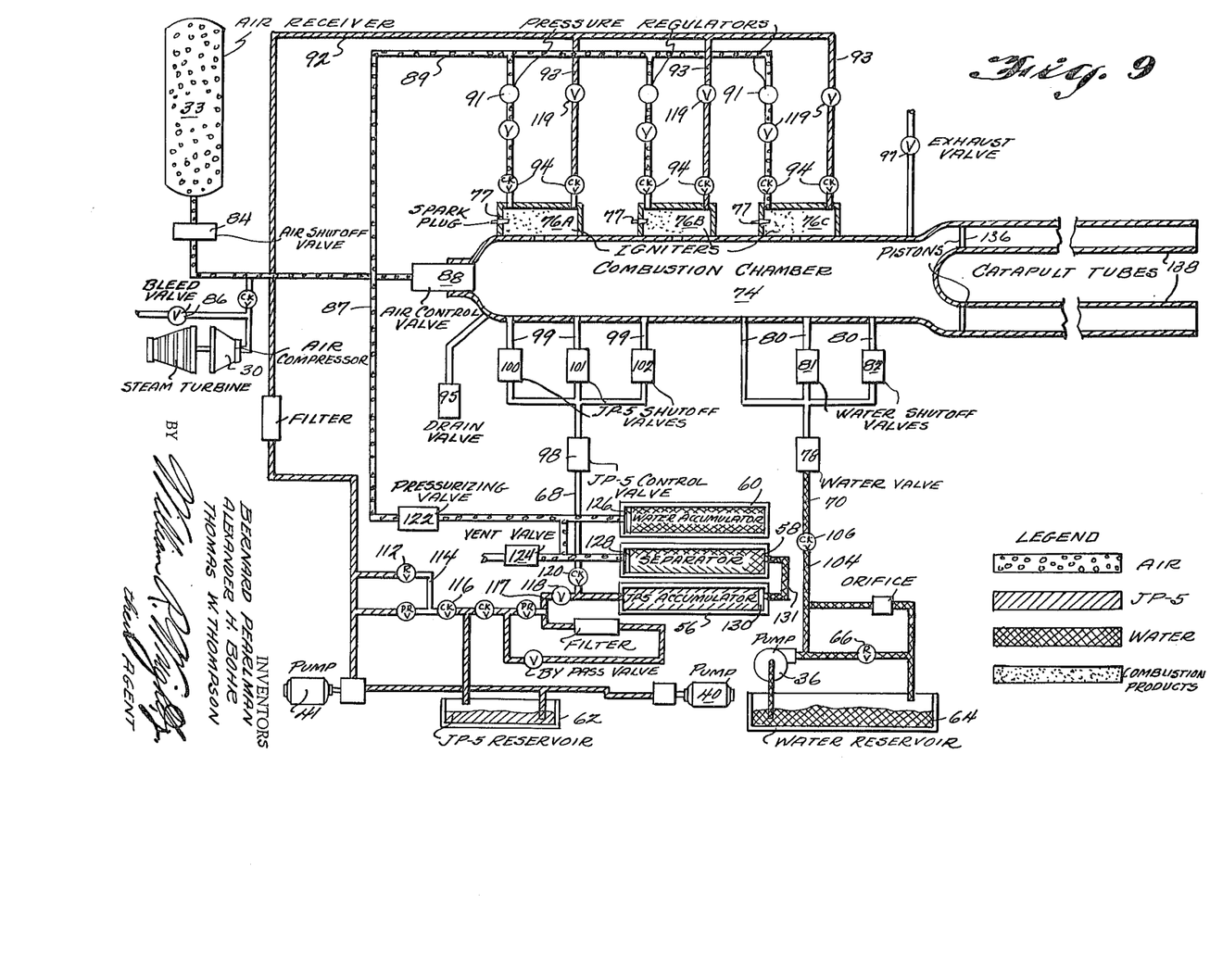
FIGURE 9 is a similar view showing phase 2, 3 and 4 conditions, the completion of the charge, the setting of the load, the firing of the igniters.

Phase II, completion of charge, FIGURE 8 and accumulator showings of FIGURE 9.

In this phase, the air receiver 33 is fully charged and the pistons 130 and 126 have reached the ends of the fuel and water accumulators 56 and 60 respectively. Although the charging of the accumulators has thus been completed, the pumps 40, 41 and the compressor 30 continue to operate. Excess air from the air compressor is vented to the atmosphere through the bleed valve 86. Excess fuel and water is returned to their respective reservoirs 62 and 64 through by-pass lines and suitable valving. Relief valves 35, 112 and 66 are respectively provided as safety devices to protect the system against over-pressurization.

Phase III, setting of load, FIGURE 9.

When all accumulators have been charged, the load set and the interlocks completed, operation of the "first ready" push button will close the accumulator vent valve 124, and open the accumulator pressurizing valve 122. This permits the high pressure air from the receiver 33 to pressurize the fuel and water accumulators 56 and 60. At the same time the combustion chamber drain valve 95 and the catapult tube exhaust valve 97 close. The air compressor 30 automatically recharges the air receiver 33 to make up for the air consumed in pressurizing the fuel and water accumulators.

The launching of a given aircraft imposes a specific gas demand upon the catapult powerplant which demand varies with the weight of the aircraft and its take-off speed. The adjustment of the powerplant for a particular aircraft involves two basic adjustments:

(1) A pressure setting;
(2) A range selection.

The pressure setting is made in the servo control system or program control which maintains the desired combustion chamber pressure.

The second adjustment involving range selection involves the adding of additional groups of fuel and water injectors when higher propellant flow rates are needed. This balances the pressure losses in the system. The additional injectors for higher flow rates limit the injector pressure drop so that the servo operated control valves 88, 98 and 78 can maintain precise control over the combustion chamber pressure no matter which of the many types of aircraft is launched. The range selection is accomplished by opening the proper range selector valves 100, 101, 102, 81 and 82.

Phase IV, firing the igniters, FIGURE 9.

The igniters 76A, B and C are fired by pushing the "fire" button on a control console (not shown). Compressed air from the air receiver 33 and fuel from the igniter fuel pump 41 are admitted by the valves 119 to and burned in the igniters 76A, B and C. The spark plugs initiate the combustion and high temperature flames art forced into the combustion chamber 74.

Figure 10:
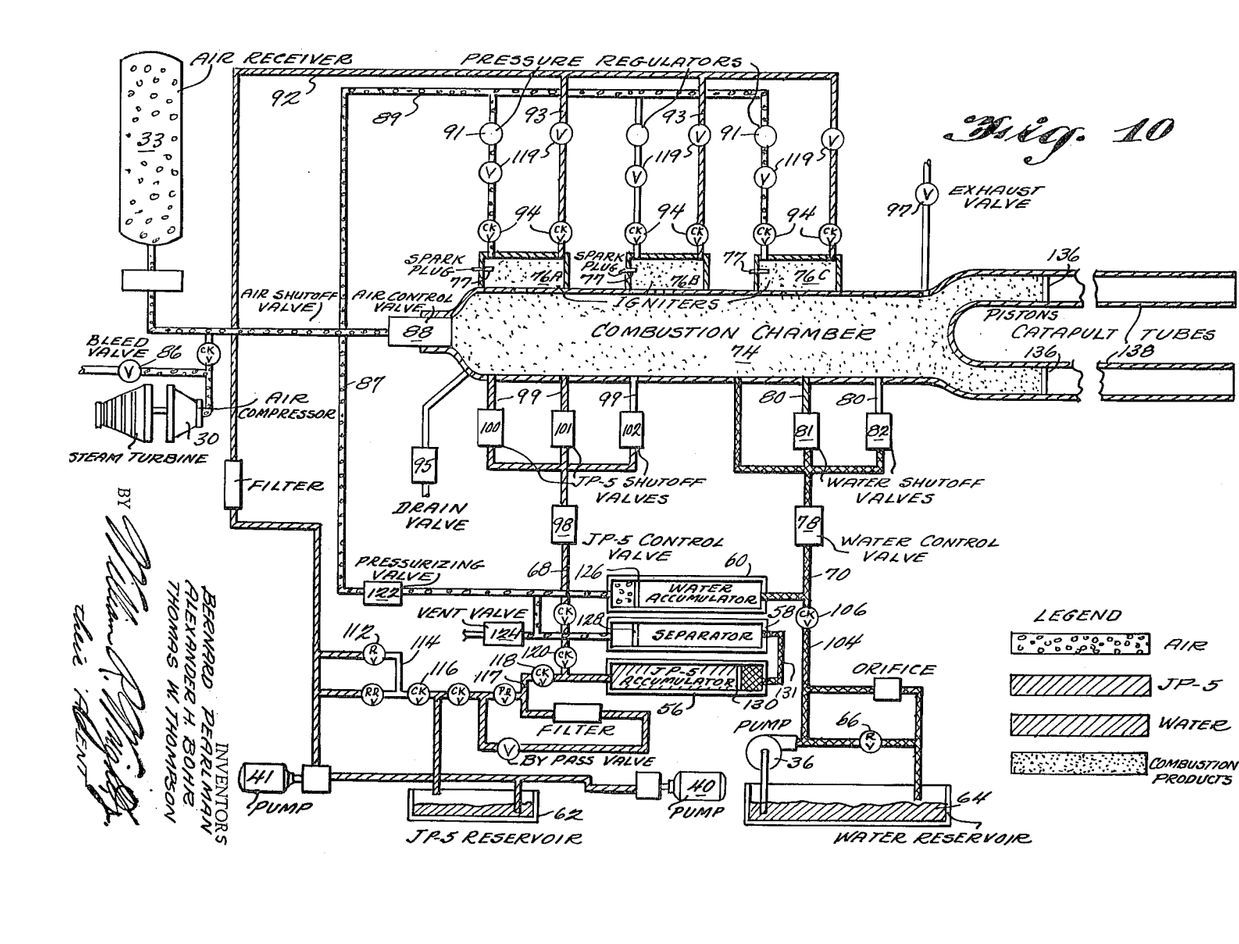
FIGURE 10 is a similar view showing phase 5 and 6 conditions, the firing of the catapult, and the completion of launching (beginning of the next charge)

Phase V, firing the catapult, FIGURE 10.

The catapult is fired automatically when the igniters 76A, B and C and come up to temperature. The control system (FIGURES 12A, 12B and 12C and 12D) signals the air, fuel and water control valves 88, 98 and 78 to open and allow the propellants to flow into the combustion chamber 74. The combustion of the air and fuel is initiated by the flames from the igniters 76A, B and C. Although the combustion process is self-sustaining, the igniters continue firing for added reliability.

The water is injected to lower the temperature of the combustion products and to prevent overheating of the catapult tubes 138. The launching pistons 136 and attached aircraft are pushed along the catapult tubes 138 under the combustion pressure which is maintained constant by the control system. The withdrawal of air from the receiver automatically causes the bleed valve 86 to close and the compressor 30 to start making up for the loss.

Phase VI, completion of launching, FIGURE 10.

When the aircraft is launched, a signal from the launching pistons 136 directs the control system to close the three control valves 88, 98 and 78. At approximately the same time, the exhaust valve 97 is opened, the igniters 76A, B and C are shut down, and the accumulators 56, 58, 60 are vented by closing the pressurizing valve 122 and opening the vent valve 124.

The pressure in the combustion chamber 74 and catapult tubes 138 starts decreasing as the combustion products are vented through the exhaust valve 96. The compressor 30 continues re-charging the air receiver 33 and the fuel and water pumps 40, 41 and 36 automatically start recharging their respective accumulators 56 and 60.

Figure 11:
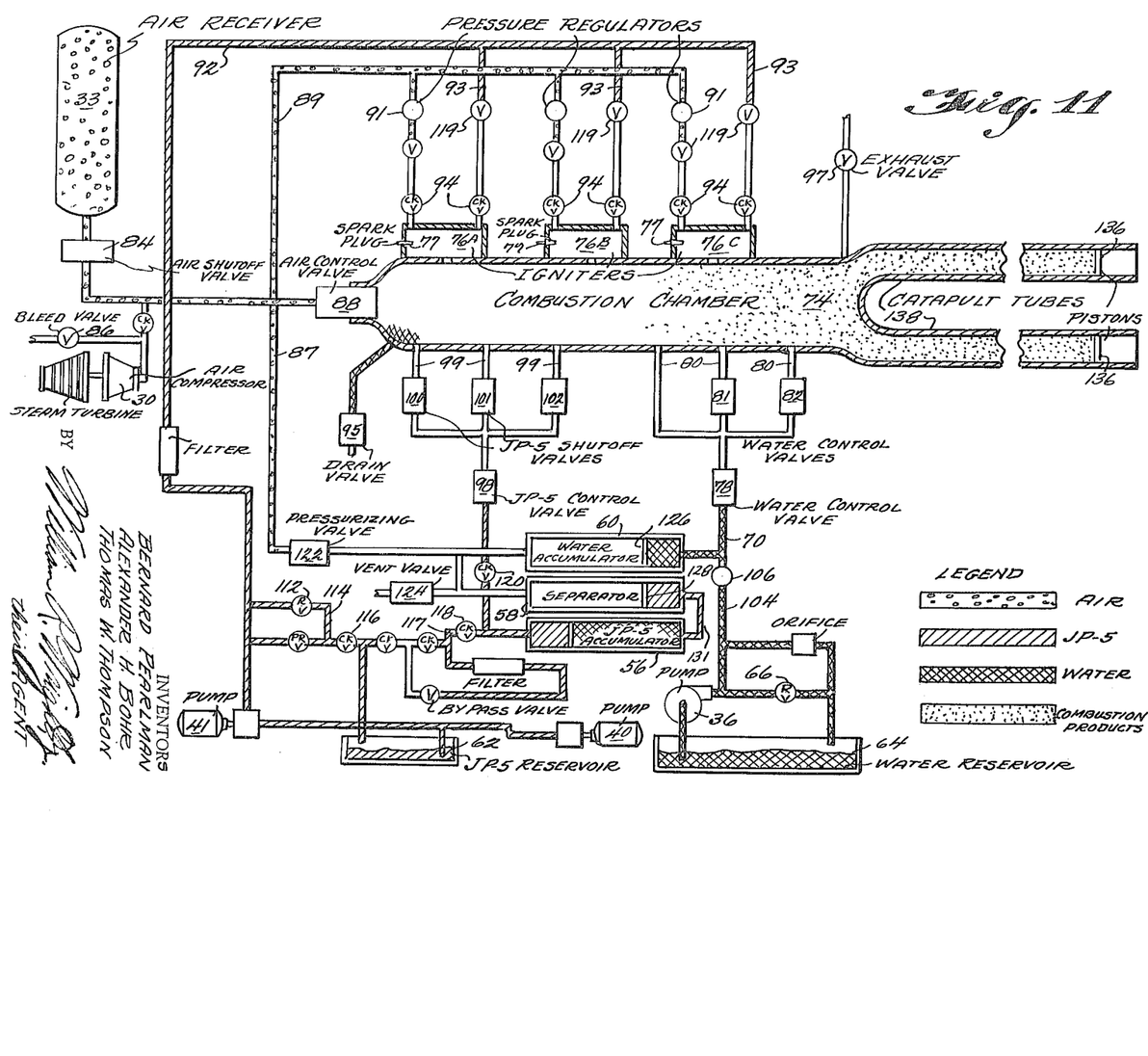
FIGURE 11 is a similar view showing the final or phase 7 conditions, chamber draining (system charging)
Figure 12A:
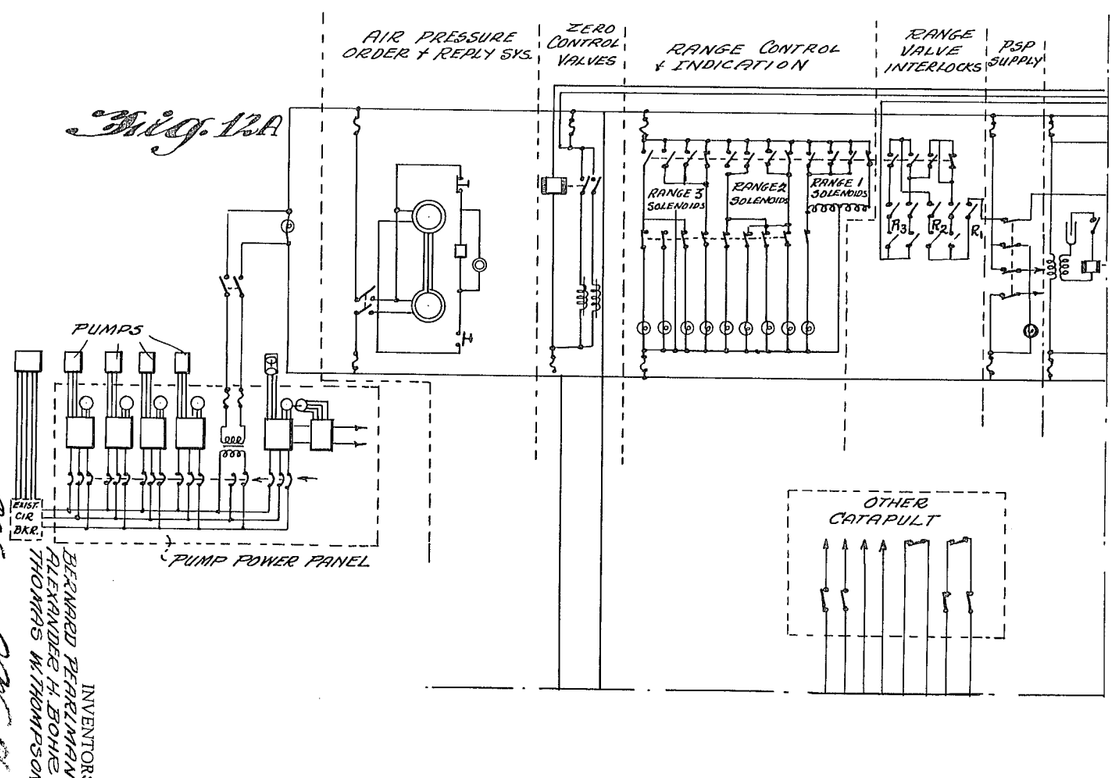
FIGURES 12A, 12B, 12C and 12D comprise a schematic wiring diagram of the electrical interlocks and automatic controls used with the automatic propellant supply or charging system and to signal the combustion control system.
Figure 12B:
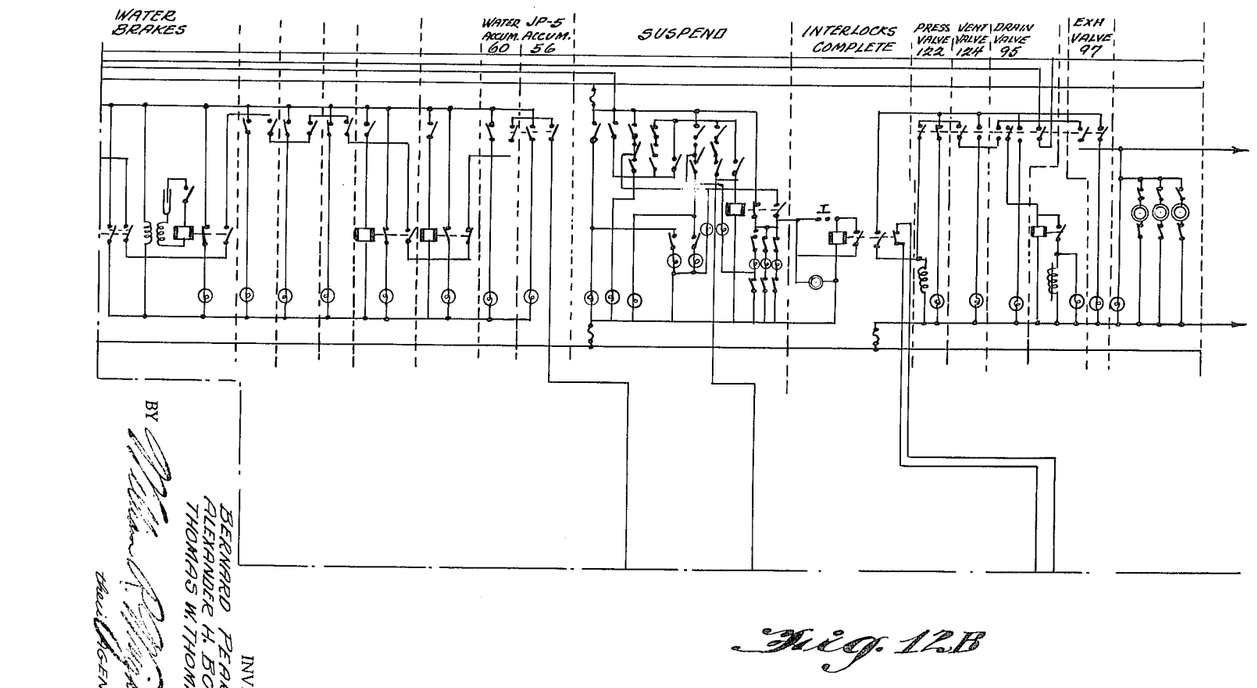
Figure 12C:
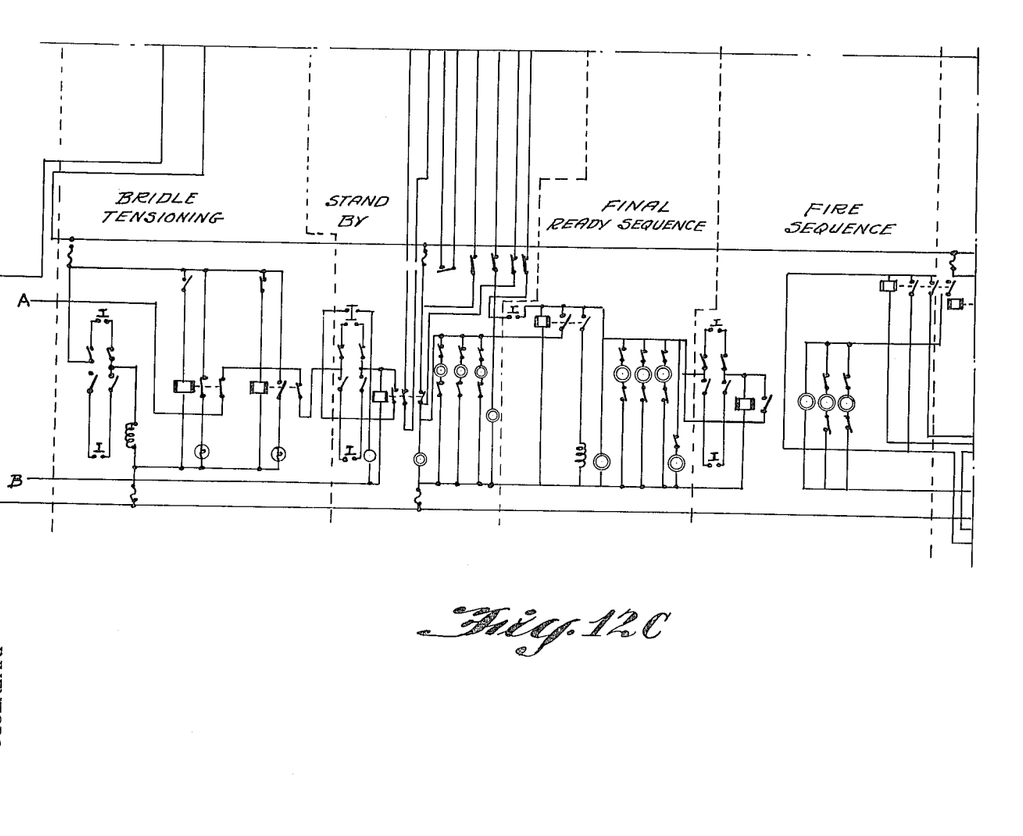
Figure 12D:
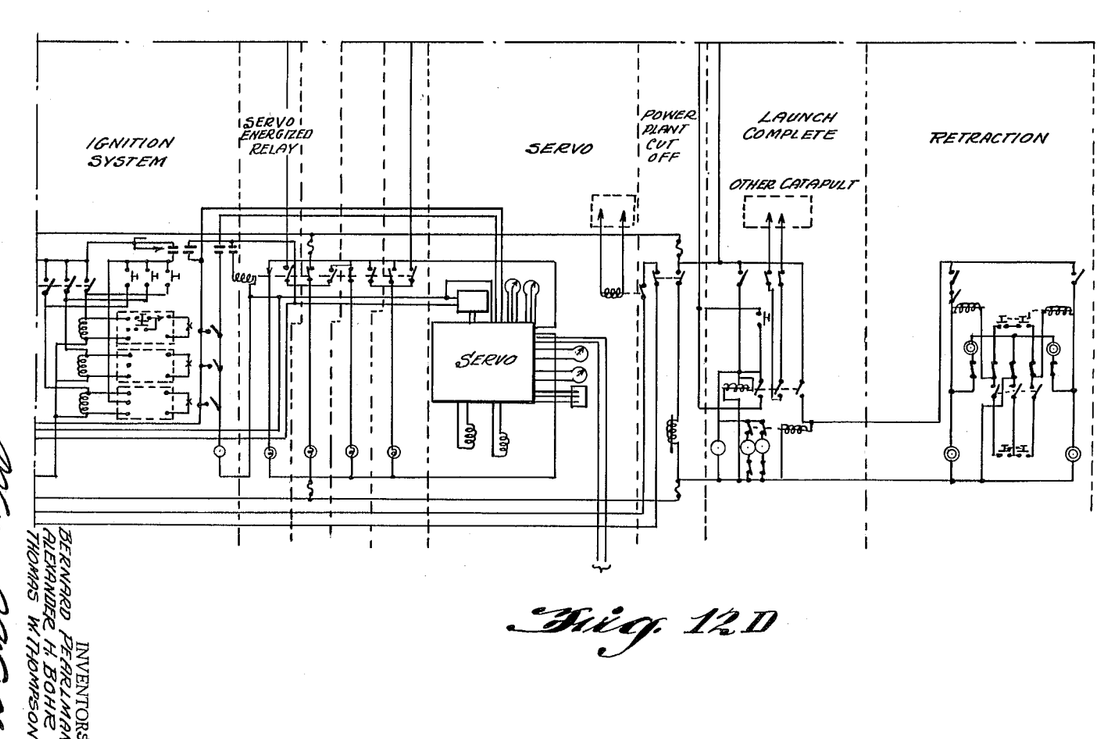

Phase VII, chamber draining, FIGURE 11.

When the combustion chamber pressure is vented by the exhaust valve 97, the drain valve 95 opens automatically. A post run cooling system sprays a small amount of water into the combustion chamber 74, to cool it for the next run. The post run cooling water plus any excess water and fuel injected during the launch, flow out through the drain valve 95.

When the charge is again complete, the powerplant is ready for the next launching. This means returning to phase III. However, the load need be reset only if there is a change in the type of aircraft which is to be launched.

The system described can produce pressures from about 50 to 1000 lbs./square inch by varying the rate at which the propellants are burned. Similarly, a range of gas temperatures can be produced from about 200° F. by changing the ratio of water to the combustibles—fuel and air. The system can operate for about 0.3 to 50 seconds and maintains constant pressure and temperature in the face of varying gas flow demands.

It is to be understood that the form of the invention herewith shown and described is to be taken as a preferred example of the same and that various changes in the shape, size and arrangements of parts may be resorted to without departing from the spirit of the invention or the scope of the subjoined claims.

We claim:

1. A powerplant for generating high pressure and temperature gases comprising, in combination, an elongated combustion chamber, separate fluid accumulators for storing fuel and cooling water, a plurality of conduits connecting each of said accumulators with said combustion chamber to deliver fuel at separate axially spaced points and to deliver cooling water at different and separate axially spaced points, piston means for delivering fluid from said accumulators through said conduits, main and selector valve means controlling the flow from said accumulators through each of said conduits to said combustion chamber, means including a main valve for supplying compressed air to said combustion chamber for admixture and combustion with said fuel and to said piston means for igniting said fuel and air in said chamber, presettable control means operably connected with all of said selector valve means and operable upon activation of the powerplant to selectively and automatically control the operation thereof and the volume of flow of fluids to the combustion chamber at each of said points to vary the combustion rate and pressure of said gases in accordance with the preset control condition, and control means responsive to combustion chamber pressure fluctuation and connected to and operable to adjust said main valve means and said main valve to maintain constant pressure in said combustion chamber.

2. The combination recited in claim 1 wherein said combustion chamber, fluid delivering means, and compressed air supplying means are each separate integrated assembly units co-operatively coupled and interconnected.

3. A powerplant for generating high pressure and temperature gases comprising, in combination, an elongated combustion chamber, separate fluid accumulators for storing fuel and cooling water, fuel and water main control valve means, conduits connecting said respective accumulators and valve means, a plurality of auxiliary conduits for fluid flow in parallel connecting each of said valve means with said combustion chamber to deliver fuel at separate axially spaced points and to deliver cooling water at different and separate axially spaced points, selector valves mounted in and controlling the flow through said auxiliary conduits, means including a main valve for supplying compressed air to said combustion chamber for admixture and combustion with said fuel and to said accumulators to eject fuel and water into said conduits, presettable control means operably connected with said selector valves and operable upon activation of the powerplant to selectively and automatically control said selector valves to vary the amount of fuel and water supplied to and injected in said combustion chamber at said axially spaced points in accordance with the preset control condition, and control means responsive to combustion chamber pressure fluctuation and connected to and operable to adjust said main fuel, water, and compressed air valve means to vary the amounts of combustion fluids in said chamber to maintain a constant pressure therein.

References Cited in the file of this patent

UNITED STATES PATENTS

| | | |
|---|---|---|
| 864,315 | Lentz | Aug. 27, 1907 |
| 964,574 | Sodeau | July 19, 1910 |
| 979,787 | Noyes | Dec. 27, 1910 |
| 1,154,131 | Sands | Sept. 21, 1915 |
| 1,382,769 | Ferguson | June 28, 1921 |
| 1,793,640 | Schilling | Feb. 24, 1931 |
| 1,988,456 | Lysholm | Jan. 22, 1935 |
| 2,078,958 | Lysholm | May 4, 1937 |
| 2,289,766 | Fieux | July 14, 1942 |
| 2,408,111 | Truax et al. | Sept. 24, 1946 |
| 2,485,601 | Hickman | Oct. 25, 1949 |
| 2,505,798 | Skinner | May 2, 1950 |
| 2,536,597 | Goddard | Jan. 2, 1951 |
| 2,675,675 | Haueter | Apr. 20, 1954 |
| 2,697,910 | Brzozowski | Dec. 28, 1954 |
| 2,761,282 | Allen | Sept. 4, 1956 |
| 2,780,915 | Karen | Feb. 12, 1957 |
| 2,799,988 | Larrecq et al. | July 23, 1957 |
| 2,873,682 | Mason | Feb. 17, 1959 |

FOREIGN PATENTS

| | | |
|---|---|---|
| 476,195 | Great Britain | Dec. 3, 1937 |